United States Patent
Csabai et al.

(10) Patent No.: US 7,499,534 B2
(45) Date of Patent: Mar. 3, 2009

(54) SUPERVISORY COMMUNICATION SYSTEM SERVING CALLERS WITH RESTRICTED FREEDOM

(75) Inventors: Barnabás Csabai, Budapest (HU); Csaba Kató, Budapest (HU); László Josepovits, Budapest (HU)

(73) Assignee: ALIN Anstalt, Mauren (LI)

( * ) Notice: Subject to any disclaimer, the term of this patent is extended or adjusted under 35 U.S.C. 154(b) by 304 days.

(21) Appl. No.: 10/559,457

(22) PCT Filed: Jul. 21, 2005

(86) PCT No.: PCT/HU2005/000083

§ 371 (c)(1),
(2), (4) Date: Dec. 5, 2005

(87) PCT Pub. No.: WO2006/097775

PCT Pub. Date: Sep. 21, 2006

(65) Prior Publication Data

US 2007/0116211 A1    May 24, 2007

(30) Foreign Application Priority Data

Mar. 18, 2005    (HU) .................... 0500314

(51) Int. Cl.
H04M 1/66    (2006.01)
H04M 1/667    (2006.01)
H04M 1/677    (2006.01)

(52) U.S. Cl. .................... 379/188; 379/200; 379/249

(58) Field of Classification Search ............. 379/188, 379/196–200, 247
See application file for complete search history.

(56) References Cited

U.S. PATENT DOCUMENTS 5,655,013 A    8/1997    Gainsboro et al.
6,604,085 B1    8/2003    Kolls
2003/0041326 A1    2/2003    Novak et al.
2004/0078334 A1*    4/2004    Malcolm et al. .............. 705/50

FOREIGN PATENT DOCUMENTS

AU    704 431 B3    4/1999
EP    0 741 484 A    11/1996
EP    0 989 720 A    3/2000
WO    WO-03/075119 A    9/2003

* cited by examiner

*Primary Examiner*—Harry S Hong
(74) *Attorney, Agent, or Firm*—Fitch, Even, Tabin & Flannery; Norman N. Kunitz

(57) ABSTRACT

A supervisory communication system serving callers with restricted freedom, connected to a local telephone exchange and to a local computer network comprising a data base storing relevant data concerning each possible caller. The system comprises a plurality of call units (11) arranged to be accessible for the callers and each having a handset (12) for carrying out calls, a personal identification means for identifying any caller; and a camera (13) enabling observation of the callers. A switching unit (19) is coupled to each of the call units (11), and a communication server (40) having a memory (50) is connected to the switching unit (19). Supervising terminals (41) are arranged at appropriate locations and served by supervisory personnel, each of whom has a display screen (42) with multiple fields (43 to 45), a loudspeaker (46), a microphone (48) and a keyboard (47). The communication server (40) is connected to a local network for selectively receiving information from the data base concerning the callers when starting to use the system and transmitting information concerning data associated with each call. The communication server (40) is connected through the switching unit (19) to the call units (11) at the beginning of each call, and the call units (11) are activated by the caller when identifying himself. The communication server (40) then provides connection towards a free supervising terminal (41), receives and checks the telephone number dialed by the caller, dials the number and connects the caller with the called person.

4 Claims, 2 Drawing Sheets

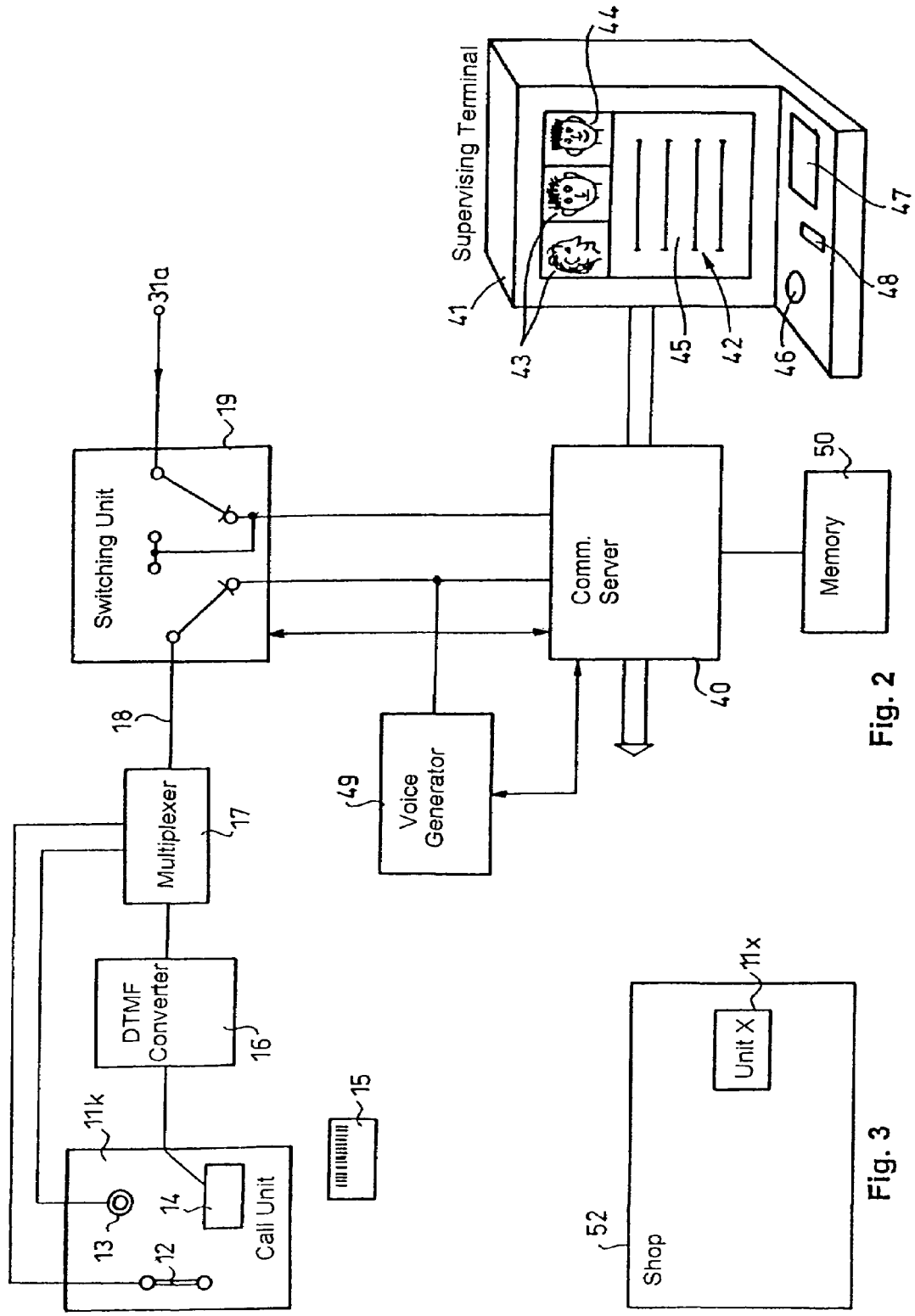

SUPERVISORY COMMUNICATION SYSTEM SERVING CALLERS WITH RESTRICTED FREEDOM

CROSS REFERENCE TO RELATED APPLICATION

This application is the National Stage filing under 35 U.S.C. 371 of International Application No. PCT/HU05/000083, filed Jul. 21, 2005, and claims priority of Hungarian Patent Application No. P0500314, filed Mar. 18, 2005.

BACKGROUND OF THE INVENTION

The invention relates to a supervisory communication system serving callers with restricted freedom, connected to a local telephone exchange and to a local computer network that comprises a data base storing relevant data concerning each possible caller.

With the development of human rights the possibilities of subjects under arrest has increased, and this includes a limited freedom to initiate telephone calls towards the outside word. Persons under arrest or detention can be divided into several categories, and it is not the objective of the present invention to define such categories but to provide a calling service to all possible callers to whom the initiation of a call is permitted. For the sake of simplicity in the following the term: "prisoner" or "caller" will be used to define subjects who are under arrest and spend their time in a prison or jail. Also, the term "prison" designated all possible institutes or campus wherein such prisoners are spending their time.

Prisoners are identified by their name and by the personal identification data, which is generally a coded number under which they are registered. Each prisoner has a specific record, which includes what restrictions are applied to them. These restrictions include the more or less limited movement in the different parts of the prison, the persons whom they can call (and their dial numbers), the time slots when initiation of a call is allowed and the time during which they have to finish a call, etc. A further restriction may include a need of a permanent inspection of each outgoing call so that the conversation cannot touch certain topics. Generally, only a small fraction of all prisoners have such a limitation, the others can carry out their calls with a higher degree of freedom.

In modern prisons the prisoners work and earn money, and they can spend the money available on their account for shopping and for covering the costs of telephone calls initiated by them.

As all state-of-the-art offices, prisons are also provided with a local telephone network served by a local exchange, and for the official staff a local computer network is available connected often to the internet.

Personal rights of the prisoners must be honored, therefore it is not allowed that the prison personnel can record the calls initiated by the prisoners, however, certain precautions should be exercised to prevent the caller from dialing numbers according to their wish and to have correspondence without any record.

The object of the present invention is to provide a supervisory communication system serving callers with restricted freedom, wherein only the minimum of required control takes place, which utilizes the available time of the inspecting personnel with the highest efficiency, wherein no subjective distinctions are made between prisoners other than defined in the sentence, and which can be installed easily at each prison.

SUMMARY OF THE INVENTION

These objectives has been met by providing a supervisory communication system serving callers with restricted freedom which is connected to a local telephone exchange and to a local computer network having a data base that stores relevant data concerning the identification and personal restrictions of each possible caller, and according to the invention the supervisory communication system composes:

- a plurality of call units arranged to be accessible for the callers and each unit comprises a handset for carrying out calls, a personal identification means for identifying any caller; and a camera enabling observation of the callers;
- a switching unit coupled to each of the call units;
- a communication server with a memory and connected to the switching unit;
- supervising terminals arranged at appropriate locations being served by supervisory personnel, each of the terminals have a display screen with multiple fields, a loudspeaker, a microphone and a keyboard;
- the communication server is connected to the local network for selectively receiving information from the data base concerning the callers when starting to use the system and transmitting information concerning data associated with each call, wherein the communication server is connected through the switching unit to the call units at the beginning of each call, the call units are activated by the caller when identifying himself, the communication server provides connection towards a free one of the supervising terminals, receives and checks the telephone number dialed by the caller whether it is listed among the numbers allowed, upon successful checking dials the number through the local telephone exchange, and following successful establishment of the connection towards the called person activates the switching unit to connect the caller's line with the called person's line; furthermore, in association with each call the communication server stores samples of information of the call in the central data base, and the stored data are accessible through the local network to officers using an appropriate authorization code.

In a preferable embodiment the personal identification means is an access card comprising a bar code generated from the personal identification data of the caller by using a code expansion algorithm, and the call units comprise respective bar code readers for reading said bar code.

The identification of the caller becomes easy if in the screen of the supervising terminals respective ones of the fields are associated with displaying the stored pictures of the caller and with displaying the picture taken momentarily by the camera, and the screen comprises a text field listing predetermined information concerning the ongoing calls.

The movement and installment of the call units will be easier if all information from the call units can be transmitted as an audio frequency information. To that purpose the call units comprise respective converters converting the digital values of the bar code reader into DTMF tones, and a multiplexer channeling outputs of the converter, the telephone handset and the camera to a cable leading to the switching unit.

It is preferable if the communication server comprises a voice generator connected through the switching unit to the handset to report to the caller by human voice certain information concerning the call upon control of the communication server.

In a further preferable embodiment the supervising terminals are designed to serve a predetermined number of calls at a time, and in a text field of the display screen respective areas are assigned to each one of the processed calls, and the supervisor can use the keyboard to select any one of the calls, whereby the corresponding stored and momentarily made pictures of the caller of the selected call is displayed in other fields of the screen, and the loudspeaker is connected to that selected call.

It is preferable if the supervising terminals comprise a key for signaling that a supervisor is serving that terminal, and the supervising terminals are programmed that the supervisor can enter by the microphone in any selected call to direct instructions and can interrupt any selected call.

In that case it is further preferable if in the supervising terminals a special-display signal and optionally a tone signal is associated with any new call that requires permanent inspection, and the communication server is programmed to connect a single call to any one of the supervising terminals that call requires permanent inspection.

A further utilization of the system is made possible if in the campus at least one shop is provided which is accessible for the callers, and at least one of the call units is equipped in the shop and comprises a bar code reader, whereby any purchase of any caller can be paid from the account of the caller after identification by the communication server using the access card.

The supervisory communication system according to the invention meets all the preset objectives, it can be installed easily, and it controls the establishment of the calls imposing minimum load on the caller but provides the required security and control over each call. The system utilizes the time of the available supervisory personnel with the maximum efficiency and treats each caller without any subjective attitude.

The supervisory communication system according to the present invention will now be described in connection with preferable embodiments thereof, wherein reference will be made to the accompanying drawings.

BRIEF DESCRIPTION OF THE DRAWINGS

FIG. 2 shows the block diagram of a preferable embodiment; and

FIG. 3 shows a shop equipped with a special call unit.

DETAILED DESCRIPTION OF THE INVENTION

Figure 1:
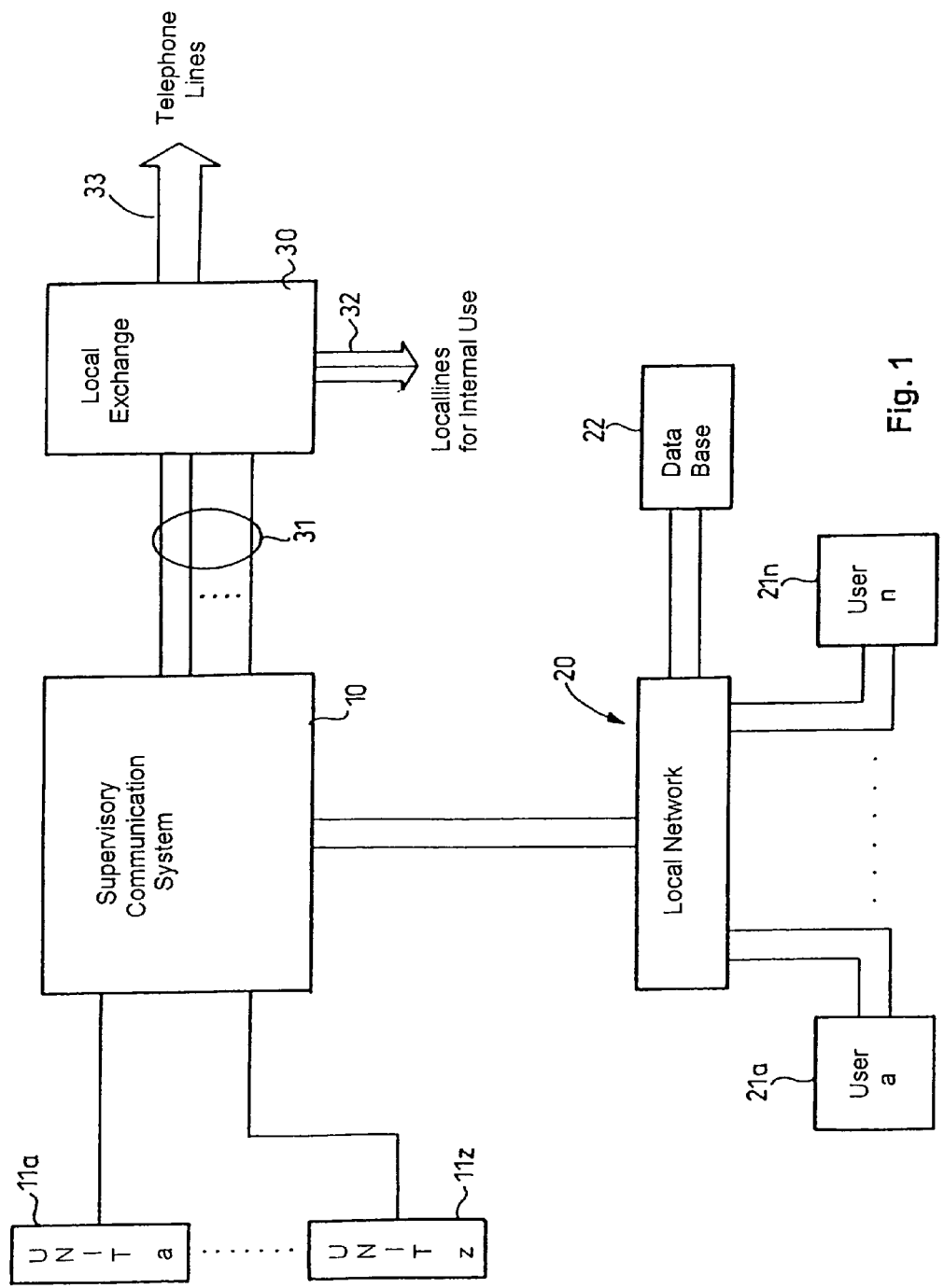
FIG. 1 show how the present invention can be installed into an existing system.

FIG. 1 shows the way how a supervisory communication system 10 designed according to the present invention can be functionally adapted to an existing communications and telephone system installed in a prison. Most prisons are equipped with a local data communication system 20, i.e. a local network, comprising a number of user terminals 21a to 21n, a central data base 22. The data base 22 stores relevant information concerning all subjects under detention (in the following: prisoners or callers). In the prison there is a local telephone exchange 30 having a number of local lines 32 assigned to serve the needs of the personnel of the prison, and a group 31 of the local lines is assigned for being used by the prisoners. The local telephone exchange 30 has a number of trunk lines 33 connected to a public telephone exchange (not shown).

The supervisory communication system 10 according to the invention is adapted to provide telephone services for the prisoners in such a way that the service will always be in line with the particular rules applicable to each of the prisoners who can have access to the telephone services as it will be explained in detail. For that purpose a number of call-units 11a to 11z are arranged in different locations in designated areas of the prison to which the prisoners can get access. Each of the call units 11a to 11z is connected to the supervisory communication system 10, preferably through customary telephone lines just like normal users of the local exchange 30.

FIG. 2 shows schematically the establishment of a connection between a call unit 11k and a local line 31a. The call unit 11k is a wall-mounted box comprising a conventional telephone handset 12 hanged on the front panel of the call unit 11k, a camera 13 (constituted by a generally used web cam) sunk in the front panel directed to take a close picture of the subject using the unit, and a bar code reader 14 also arranged at a designated area of the front panel. Each prisoner has a unique personal code, and the use of the system requires that the user has an access card 15 bearing a bar code with coded data required for his/her personal identification.

In view of the fact that the call unit 11k can be arranged anywhere in the prison, it can have either a stationary arrangement or a portable design capable of being moved in the cell of a strictly guarded convict, the connection of the unit 11k should be as flexible as possible. It is known that wires with high bandwidth capable of transmitting information with high speed are bulky and cannot be realized by flexible wires. The unit 11k comprises preferably a converter 16 which converts the stream of zeros and ones obtained from the bar code reader 14 into standard DTMF tones used for tone dialing in telephone systems. Preferably, a multiplexer 17 is also used to connect the audio line coming from the handset 12, the video line coming from the web cam 13 and the tone signal sequence of the DTMF converter 16 into a cable 18. The cable 18 is preferably a standard multistrand wire carrying audio frequency signals only, thus its length can be varied freely within a wide range. The cable 18 is connected to a switching unit 19 of the supervisory communication system 10. The switching unit 19 is a multi-channel controlled switching device, wherein the number of the channels corresponds to the number of the call units 11a to 11z. The schematic view of FIG. 2 shows only a single channel which is associated with the cable 18 assigned to the call-unit 11k. The switching unit 19 receives also one of the local lines, in the exemplary case local line 31a that is connected to the local exchange 30 (FIG. 1).

The local network 20 comprises a communication server 40 which is connected with the switching unit 19. The communication server 40 has an own memory 50 and the server 40 is connected to a plurality of supervising terminals 41, wherein the number of the supervising terminals 41 is substantially less than the number of the call units 11a to 11z. The number of the supervising terminals determines how many supervised calls are allowed to be built up in the system at any moment. FIG. 2 shows only a single supervising terminal 40, as it is sufficient for supervising the calls initiated from the call unit 11k. The switching unit 19 is connected to the communication server 40 in such a way, that the communication server 40 receives the local line 31a, receives the cable 18 of the call unit 11k, but the cable 18 of the call unit 11k is never connected directly to the local line 31a until the communication server 40 does not issue a command that such a connection should take place. This measure provides the required security that the caller at the call-unit 11*k* cannot manipulate the unit so that a call without adequate control can get through to the local exchange 30.

The communication server 40 is connected to the local network 20 and it has a limited access to the database 22.

The supervising terminal 41 is served by the professional staff of the prison and they are wardens or inspectors, who know personally the prisoners who might initiate a call. This condition can be fulfilled by the correct association of the call units with a predetermined number of supervising terminals.

The operation of the system according to the invention is as follows. Each prisoner, to whom the initiation of telephone calls is allowed, is provided with a card 15 bearing his/her identification data in a coded form recorded in bar code. Naturally, instead of bar codes any appropriate carrier can be used (magnetic stripe, 3D code or an RFID tag). For the sake of simplicity bar codes will be illustrated. The coding of the identification data may occur by using any appropriate expansion algorithm by which identification numbers following each other in a sequence will be coded so that neighboring numbers will have very different codes. In this way if the bar-code reading operation is disturbed or someone tries to manipulate it, it is practically impossible to arrive from a recorded code to an other person's recorded code, since such coded numbers will be very far from each other. Any error in the reading will therefore become very unlikely to identify a wrong person.

In association with each prisoner detained in the campus a number of relevant information is stored in the central data base 22. These are e.g. his/her picture from different views, the time periods when initiation of phone calls is allowed, the maximum calling time in a given period (e.g. weekly), the duration of any individual call, the telephone numbers which he/she is allowed to call, the available amount of money he/she can spend on telephone calls or on other expenditures and certain limitations concerning his/her freedom to talk. The highest limitation is that he/she can talk only when an inspector is listening to the conversation. The stored data of the caller, which are generally retrieved from the central data base 22 by the communication server 40 in response to using the card 15 are summarized in Table 1.

When a caller goes (or allowed to go) to the call unit 11*k*, the ID card 15 must be moved in front of the bar code reader 14 and the handset 12 has to be removed from its hook. The switching unit 19 is then in an initial position, wherein the cable 18 of the call unit 11*k* is coupled directly to the communication server 40. The server 40 notices that the handset 12 has been lifted and a bar code has been read. Based on the bar code, the subject is identified, and the communication server 40 retrieves the listed information (summarized substantially in Table 1) from the central data base 22, stores them temporarily in the local memory 50 and passes this information to the supervising terminal 41.

TABLE 1 data that can be retrieved fro the central data base 52

Stored picture
Account status of the caller
Telephone numbers allowed for the caller to dial
Maximum duration of a call
Total calling time in a period
Is permanent inspection required or not
Other restrictions The supervising terminal 41 has a display screen 42 divided in several fields. In fields 43 the picture(s) taken from the subject will be displayed, while on field 44 the picture transmitted by the camera 13 is shown. The officer/inspector sitting in front of the screen 42 can identify that the actual subject is the same as the person whose card 15 has been used. The fact that an inspector is actively using the supervising terminal 41 is reported to the communication server 41 by the inspector by pushing a "ready" button on a keyboard 47. The communication server 40 contacts only those of the supervising terminals 41 which are in "ready" state.

Following the identification of the caller and the retrieval of the relevant information, the communication server 40 activates a voice code generator 49 which informs the caller on the amount available on his account and if that amount is sufficient, allows the continuation of the call. The caller can now dial the number, and the communication server 40 checks, whether the number dialed is among the stored numbers permitted for the particular subject. The dialed number is temporarily stored. As a further precaution, the system establishes the required degree of supervision. In the most simple case two grades of supervision are allowed:

if the called number is one of the stored and permitted number, the call can get through and listening is no required; and if the subject is on severe punishment, calls are allowed only if an officer is listening.

If listening is not required, the communication server 40 activates the connection towards the local line 31 *a* and dials the temporarily stored number. When the connection has been established, the communication server 40 changes the position of the switches in the switching unit 19 so that the cable 18 gets connected with the local line 31*a*, but the connection with the communication server 40 and with the supervising terminal 41 remains established.

On the screen 42 of the supervising terminal 41 in a further text field 45 a line is displayed that comprises the name and/or the ID code of the caller and further data on the limitations of the call if such limitations exists. As an option the starting time of the call, the name of the called person and other information can be displayed. The supervising terminal 41 has a loudspeaker 46 (or headphone), the keyboard 47 as well as a microphone 48.

The supervising terminal 41 can process and allow a predetermined number of calls at a time, and every call is represented by a line on the text field 45. The inspector can select with his keyboard 47 any one of the ongoing served calls by clicking on the corresponding line on the text field 45, and then the conversation of the selected call will be transmitted through the loudspeaker 46, and the fields 43 and 44 will display the stored and actual pictures of the caller of the selected call. In case of need the inspector can use the microphone 48 to enter into the ongoing conversation, e.g. to announce a warning if the conversation touches subjects not-permitted for the caller. The inspector can always break the ongoing calls if he finds that the continuation of the conversation would be against the preset rules.

While the supervising terminal 41 is capable of allowing a predetermined number of calls at a time, of these calls only one can be such that requires continuous inspection. Calls requiring permanent inspection are treated in a special way. If the new caller is a person whose conversations must be inspected, the communication server 40 directs such a call to a supervising terminal which has no such an ongoing call that requires permanent inspection or to a free supervising terminal. In the first case (when there are already a number of ongoing calls through the supervising terminal) the requirement of permanent inspection is displayed when the call is initiated, and the inspector has to listen and service that call.

If he is unavailable or is busy with a different call, the communication server 40 passes the task of listening to this particular call to another supervising terminal and the officer sitting at that terminal will listen to the call. In case if there is no free supervising terminal with an available inspector, the communication server 40 informs the caller that the call cannot be established, he/she should try again at a later period. In this way it is always ensured that calls requiring permanent inspection can get through when there is actually a free supervising terminal with an inspector.

According to a basic feature of the present invention, the caller will get through towards the local line only when the called number has been identified and found, the caller has been identified and the connection towards the caller has been established. There is no direct connection between the line 18 of the caller and the local line 31 a until the communication path has been built up, therefore the caller cannot call a non-allowed number and cannot receive any dial tone and cannot dial directly.

In addition to the very cautious establishment of an outgoing call the supervisory communication system 10 according to the invention carries out a number of further operations, which serve recording purposes. When a prisoner wishes to place and outgoing call, the system stores his picture as seen by the camera 13, his identification data (name and number), the dialed number (even if it was erroneous), the date and time of the call, the duration and cost of the call. During the conversation it stores short segments of the conversation sufficient for the voice analysis of the caller and the called person but too short to be able to understand what was said (to preserve the personal rights of the caller), a few pictures of the caller associated with time data and other information programmed in advance. Table 2 shows the list of the information which is stored for each calls (even of non-established call segments).

TABLE 2 list of stored information concerning each call

ID of the caller
Dialed number
Starting and finishing time of the call
Date of the call
Duration of the call
Cost of the call
Samples of the camera picture at predetermined intervals
Short samples of the conversation with associated time data
Any error or forceful break of the call
Any failure in establishing the call
Information on the purchased items In view of the fact that each owner of an ID card 15 can identify himself/herself by using the card 15 and the system according to the invention can retrieve information from the local network 20 concerning the available amount of the account of the card holder, the system can be used not only for enabling telephone calls but also for controlled expenditures in any shop within the restricted area. Such shops are generally buffets or general stores as indicated by reference numeral 52 on FIG. 3. A special unit 11x can be arranged within the shop, which can be similar to the call units 11a to 11z but they need not comprise a handset 12 or even a camera 13 but only a code reader 14. The purchase can occur by moving the card 15 in front of the code reader 14, and the purchase will be carried out when the account provides coverage for the selected items. In case if a regular call unit 11 is equipped in the shop 52, the handset 12 can be used for informing the buyer on the transaction and on the balance of his/her account after the transaction. In a preferable embodiment the system can also store data relating to the purchased items and the date and time of each transactions, whereby a more accurate profile information can be collected concerning the shopping behavior of any inspected prisoner.

The system stores substantial amount of information concerning each user of the system. This information is stored in the central data base 22 of the local network 20. Access to such data is provided for officers or other high ranking personnel of the prison, and each person to whom access is granted, obtains an authorization code that determines the personal limits of such access. As mentioned earlier, the local network 20 has a number of user terminals 21a to 21n at different offices in the campus, and each of these user terminals 21a to 21n can be used for retrieval of the information after using the authorization code. Information can be obtained concerning the calling profile of any selected prisoner or certain standard printouts can be made at regular intervals. The system can be programmed to report suspicious events, e.g. if someone has called a number to which he/she was not authorized or if the calls of a person must have been interrupted frequently by the supervising personnel.

The system according to the invention has been described in connection with a preferable embodiment. It has been shown that the identification of the caller occurs by using the card 15 and by comparing the stored picture with the picture transmitted through the camera 13. Of coarse, several other personal identification means can be used including fingerprint readers, voice analyzers and other more sophisticated identification methods, therefore the invention is not limited to the way how the identification of the caller is solved.

The system shown has certain advantages, which lie in its simple design, the possibility of using a normal telephone line 18 between the calling units 11 and the switching unit 19. It is very important that the caller is not connected with the lines 31 of the local exchange until a connection is established towards the called person whose number has been checked, whereby the caller cannot dial directly.

The supervision is solved in a simple way, in most of the cases a supervisor can handle multiple calls, and he/she gets tied to listen to a call only if the caller has such a restriction.

A further advantage of the system lies in the easy installment in any local network and local exchange, wherein the system remains independently organized therefrom.

The invention claimed is:

1. A supervisory communication system serving callers with restricted freedom, connected to a local telephone exchange and to a local computer network including a data base storing relevant data concerning each possible caller, said system comprising:
a plurality of call units arranged to be accessible for the callers and each comprising a handset for carrying out calls and a personal identification input means for forwarding personal identification data concerning any caller when initiating a call;
a control means having a memory and connected to said data base, said relevant data in said data base including the telephone numbers of persons who are allowed to be called by a particular caller and identification data of each caller, said control means receiving and examining said forwarded personal identification data to establish whether said caller is authorized for initiating a call and allow dialing if authorization is established; said control means examining furthermore any telephone number dialed by any caller and identifying whether the number is among said allowed telephone numbers to allow connection towards said local telephone exchange only if an allowed telephone number has been dialed;

a switching unit coupled to each of said call units and conditionally connecting said call units with said local telephone exchange;

a communication server in said control means connected to said switching unit, to said local telephone exchange, to said local network and to said data base, said communication server instructing said switching unit to direct and connect the line of any call unit thereto when a call is initiated by a caller, to perform said caller identification and said verification of the dialed number, wherein said caller identification including establishment of the level of the required supervision for any particular caller;

a respective camera disposed in each of said call units enabling observation of the caller and connected to said switching unit;

supervising means for storing predetermined information concerning each call, and including supervising terminals arranged at control locations, each of said supervising terminals having an active status when being served by a supervisory person, each of said terminals comprising a display screen with multiple fields, a loudspeaker, a microphone and a keyboard, said supervisory terminals being designed for the simultaneous supervision of a predetermined number of calls requiring different levels of supervision of which only one can require permanent attention; in said screen of the supervising terminals, respective ones of said fields being visual fields associated with displaying stored pictures of the caller and with displaying the picture taken momentarily by the camera, and a text field listing predetermined information concerning the call, and said supervising person can select any one of the momentarily supervised calls to associate said visual and text fields with the selected call; and, wherein upon successful verification of a caller and the number dialed as well as of said level of required supervision, said communication server dialing said number and when a connection has been established towards the called number said communication server:

(a) connecting the line of said caller with one of said supervisory terminals which is free for supervising the particular call; and (b) allowing for said switching unit to connect the caller with the line of the established connection; and in association with each call, said communication server storing predetermined information of the call in said central data base.

2. The supervisory communication system as claimed in claim 1, wherein said personal identification means is an access card comprising a bar code generated from the personal identification data of the caller by using a code expansion algorithm, and said call units comprise respective bar code readers for reading said bar code.

3. The supervisory communication system as claimed in claim 2, wherein said call units comprise respective converters converting the digital values of said bar code reader into DTMF tones, and a multiplexer channeling outputs of said converter, said telephone handset and said camera to a cable leading to said switching unit.

4. The supervisory communication system as claimed in claim 1, wherein in said supervising terminals, a specified display signal and optionally a tone signal is associated with any new call that requires permanent inspection.

* * * * *